United States Patent
Edmonds

[11] 3,843,260
[45] Oct. 22, 1974

[54] REAL TIME HOLOGRAPHIC SYSTEM
[76] Inventor: Walter R. Edmonds, 226 Woodlawn Dr., Fairborn, Ohio 45324
[22] Filed: Nov. 5, 1973
[21] Appl. No.: 412,858

[52] U.S. Cl. .................................. 356/109, 350/3.5
[51] Int. Cl. ........................................... G03b 27/12
[58] Field of Search.................... 356/106, 109, 113; 350/3.5

[56] References Cited
UNITED STATES PATENTS
3,533,675  10/1970  Brooks............................... 356/106
3,535,014  10/1970  Kurtz et al........................... 350/3.5

Primary Examiner—Harold A. Dixon
Attorney, Agent, or Firm—Harry A. Herbert, Jr.; Richard J. Killoren

[57] ABSTRACT

A real time holographic system for use in nondestructive testing having an object beam from which the return, from the object, illuminates a holographic plate. A reference beam has a pair of conical shaped reflectors in the reference beam path to illuminate the holographic plate with a substantially conical shaped beam which surrounds the object under test.

1 Claim, 2 Drawing Figures

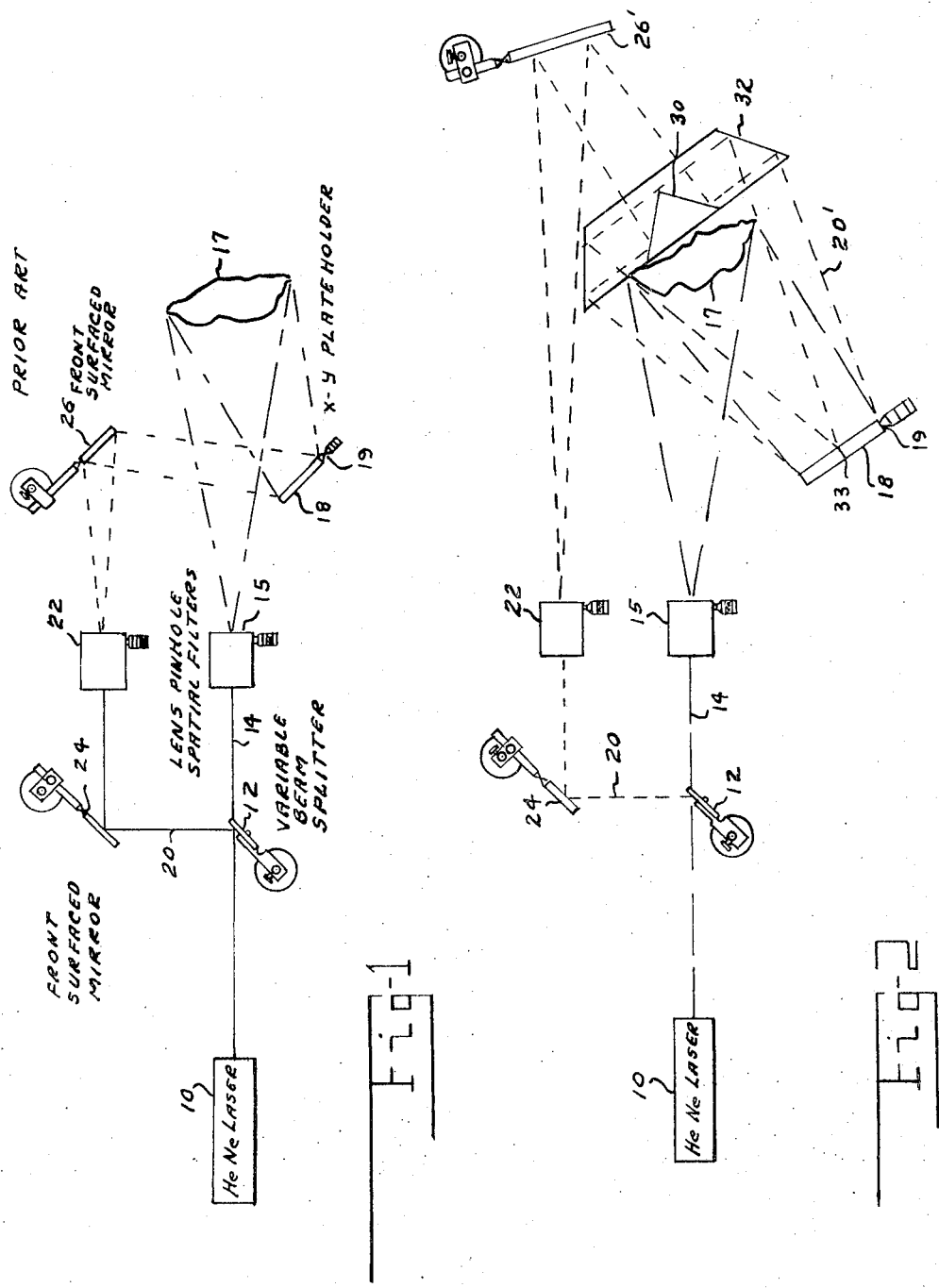

REAL TIME HOLOGRAPHIC SYSTEM

BACKGROUND OF THE INVENTION

In real time holography, such as in nondestructive testing, a reference hologram is used to generate real-time interference fringes with a subject undergoing deformation. In such systems, a hologram is first made with the test object, such as a casting, at equilibrium. The hologram is then developed and replaced in the plate holding mechanism. After adjustment for slight misalignment the casting can be stressed or heated and any deformation can be viewed directly through the hologram as interference fringes develop across the test object.

It has been determined that the resolution requirements of the holographic plate can be reduced as the angle between the object beam and the reference beam reaching the holographic plate is reduced. In prior art systems, the reference illumination has come from one side of the holographic plate which limits the minimum angle usable between the object beam and the reference beam.

BRIEF SUMMARY OF THE INVENTION

According to this invention, the effective angle between the object beam and the reference beam is reduced by providing a reflecting optical system similar to that described in the U.S. Pat. to Martin, No. 2,453,253, to provide a substantially conical shaped reference beam for illuminating the holographic plate from all sides around the object.

IN THE DRAWING

FIG. 1 shows a prior art real time holographic test system.

FIG. 2 shows a real time holographic system according to the invention.

DETAILED DESCRIPTION OF THE INVENTION

In the prior art real time holographic testing system of FIG. 1, light from the laser 10 is passed through a variable beam splitter 12 with the object beam 14 being directed through a lens pinhole spatial filter 15. The output of the lens pinhole spacial filter 15 is made to illuminate an object 17 with the return from the object 17 illuminating a holographic plate 18 in an X-Y plateholder 19.

The reference beam 20 is directed through a lens pinhole spacial filter 22 by an adjustable front surface mirror 24 with the output of the lens pinhole spacial filter 22 being directed toward the holographic plate 18 by means of an adjustable front surface mirror 26. One such prior art holographic system is the Jodon Engineering HS-1C Holographic System.

With this system, the object and reference beams are adjusted for proper intensity and with the proper exposure time determined a holographic plate is made of the object 17, such as a casting, at equilibrium. The photo plate is then removed from the X-Y plate holder and developed after which the holographic plate is replaced in the plate holder. Reillumination of the plate produces a virtual holographic image which may appear displaced from the real object due to slight misalignment of the holographic plate. The image can be made to coincide by using the X-Y controls. The absence of fringes will indicate alignment. The object can then be stressed and the deformations viewed directly through the hologram as interference fringes across the object. The fringes can be measured and the deformation calculated. The smallest angle between the object beam and reference beam attainable with such a system would be when the reference beam illuminating the entire holographic plate just passes on one side of the object.

This angle can be further reduced according to this invention by providing illumination from all sides of the object, with the illumination from any one side having to reach only to the middle of the holographic plate. The device of FIG. 2 shows such a system.

The device of FIG. 2 is substantially the same as the device of FIG. 1, except for the optical system for the reference beam. Like elements in FIGS. 1 and 2 are given like reference characters. The object and holographic plate are illuminated by the object beam in the same manner as in FIG. 1. The reference beam path has a conical reflecting element 30 receiving light from a front surface reflecting mirror 26'. Light from conical reflecting element 30 is directed toward the holographic plate 18 by a truncated conical reflecting member 32. The holographic plate 18 is positioned with respect to the conical element 32 such that the substantially conical shaped reference beam 20' meets at the center of the holographic plate as shown at 33.

The operation of the device of FIG. 2 is substantially the same as the operation described above with respect to the device of FIG. 1.

There is thus provided a real time holography system for use in nondestructive testing which imposes reduced resolution requirement on the holographic plate over prior art systems.

I claim:

1. A real time holographic system for use in nondestructive testing of an object comprising: a source of monochromatic coherent light; means for splitting said light into an object beam and a reference beam; means for illuminating the object with said object beam; a holograph plate positioned in light receiving relation to light reflected from said object; means for directing said reference beam toward said holographic plate in a substantially conical path surrounding the object with said light passing in close proximity to the object; said means for directing the light along a conical path toward the holographic plate including a first conical member having an outside reflecting surface; said conical member being positioned on the side of said object remote from said holographic plate; means for directing the reference beam light from said beam splitting means toward said conical member to thereby provide a radially directed beam; an annular truncated conical member surrounding said first conical member adapted to direct said radially directed beam toward said holographic plate along said conical path.

* * * * *